No. 811,732. PATENTED FEB. 6, 1906.
A. A. MOORE.
ARMOR FOR PNEUMATIC TIRES.
APPLICATION FILED FEB. 21, 1905.

2 SHEETS—SHEET 1.

WITNESSES.
Lewis E. Flanders
Thos. D. Longstaff

INVENTOR.
Manson A. Moore
By
Attorneys.

No. 811,732.  
PATENTED FEB. 6, 1906.  
A. A. MOORE.  
ARMOR FOR PNEUMATIC TIRES.  
APPLICATION FILED FEB. 21, 1905.  
2 SHEETS—SHEET 2.
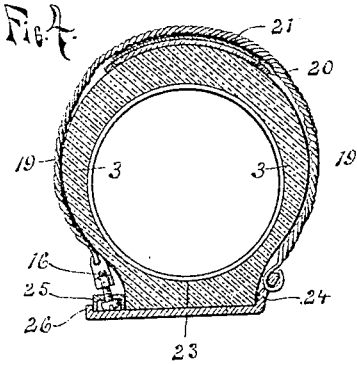
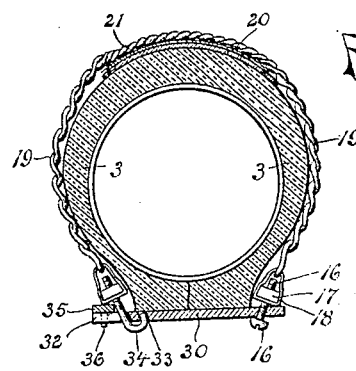
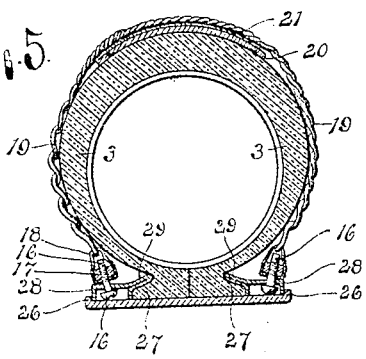
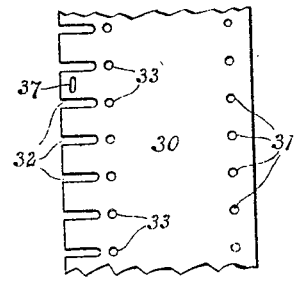
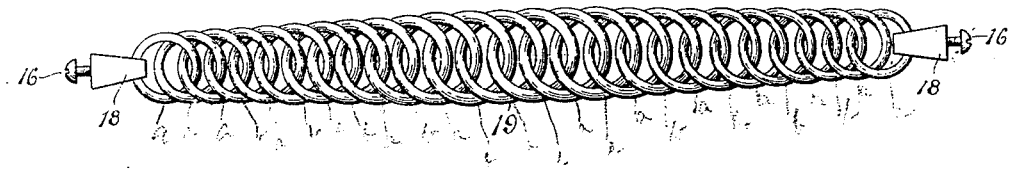
WITNESSES.
Lewis E. Flanders
Thos. D. Longstaff
INVENTOR.
Alanson A. Moore
By
Attorneys.

UNITED STATES PATENT OFFICE.

ALANSON A. MOORE, OF DETROIT, MICHIGAN, ASSIGNOR OF ONE-HALF TO FRANK H. BESSENGER, OF DETROIT, MICHIGAN.

ARMOR FOR PNEUMATIC TIRES.

No. 811,732.   Specification of Letters Patent.   Patented Feb. 6, 1906.

Application filed February 21, 1905. Serial No. 246,767.

*To all whom it may concern:*

Be it known that I, ALANSON A. MOORE, a citizen of the United States of America, residing at Detroit, in the county of Wayne and State of Michigan, have invented certain new and useful Improvements in Armor for Pneumatic Tires, of which the following is a specification, reference being had therein to the accompanying drawings.

This invention relates to an improved armor for pneumatic tires; and its object is to provide a metal covering or sheath for the tire which is so constructed as to practically obviate the possibility of the tire becoming punctured and which is so strongly constructed and attached as to positively hold the tire from bursting, yet does not interfere with its resiliency.

It is also an object of the invention to provide means for detachably securing the armor in place so that it may be quickly and easily detached to repair the tire or may be entirely removed, if desired, and to provide means for adjusting each individual member forming the armor, so as to make a smooth tread.

To this end the invention consists in forming the armor of a multiplicity of independent chains peculiarly formed and closely woven and extending transversely of the tire, each chain being attached at each end by adjusting-screws to the wheel-rim or to detachable bands secured thereto; and the invention further consists in providing the device with certain other new and useful features and the advantages of the particular arrangement, construction, and combination of parts, all as hereinafter more fully described, and shown in the accompanying drawings, in which—

Figure 1:
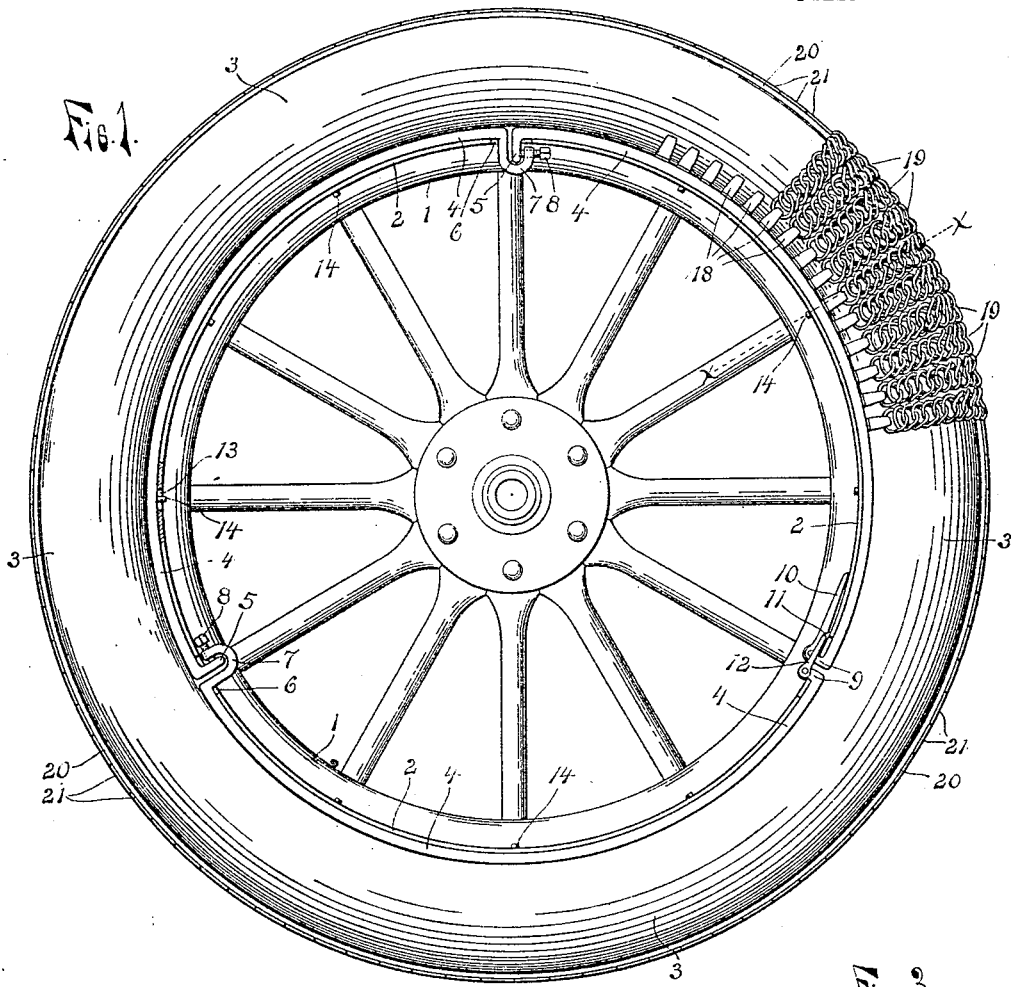
Figure 2:
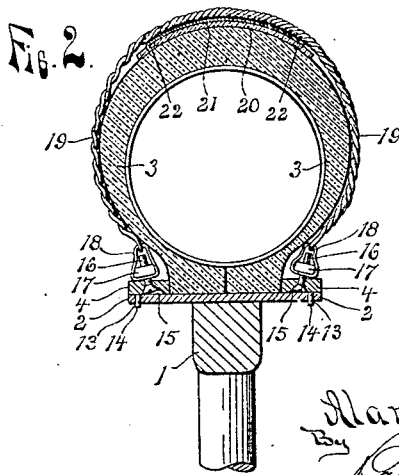
Figure 3:
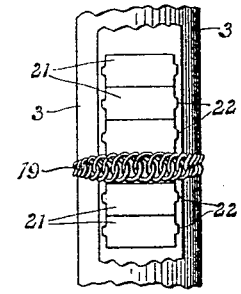

Figure 1 is a side elevation of an automobile-wheel, showing a section of the armor in place. Fig. 2 is an enlarged section on the line $x\,x$ of Fig. 1. Fig. 3 is a plan view of a portion of the tire, showing the protecting strip and plates with one of the chains in place thereon. Figs. 4, 5, and 6 are sections similar to that shown in Fig. 2, showing modified forms of fastening means for the armor. Fig. 7 is a plan view of a portion of the wheel-rim shown in Fig. 6, and Fig. 8 is an enlarged detail view of one of the chains.

As shown in the drawings, 1 is the wood rim of an ordinary automobile-wheel, and 2 a band secured to the wood rim and forming the metal rim to which the pneumatic tire 3 is secured in any manner suitable to the form of tire used. This rim 2 is of such a width that a space is left at each side of the tire for two detachable securing-bands 4, made in three segments and clamped upon the outer face of the rim by providing one end of each segment with an arm or end 5, turned inwardly through notches 6 in the edges of the rim, and two of the segments are provided each with an inwardly-extending hook or bent end 7 to hook over or embrace the arms 5, each hook being provided with a set-screw 8 at its end extending therethrough into engagement with the arm to force one segment toward the other. At the third point where the segments meet the adjacent ends are each provided with an inwardly-extending end or arm 9, to one of which is pivoted a hand-lever 10, provided with a notch 11 to receive a loop 12, pivoted to the arm 9 on the other segment. When the lever is thrown back and passed through the loop to engage the same with its notch and then thrown in the opposite direction, the lever by means of the loop will draw the segments toward each other, and thus clamp the band firmly to the tire. To prevent these bands 4 from slipping laterally from the rim, said rim is provided at intervals with slotted openings 13 to receive inwardly-extending pins 14 on the bands, the slots permitting a slight movement of the bands as they are tightened by the levers or set-screws. In each band is provided a series of countersunk openings 15 to receive screw-bolts 16, the heads of which lie within the countersinks in the inner face of the band, and on the projecting end of each of these bolts is turned a nut 17, firmly held within an inclosing loop or stirrup 18, which loops form means to which the ends of the chains 19 are attached, said chains being thus adjustably secured at each end to the bands 4.

The chains 19 are formed, as shown in Fig. 3, of two sets of links so interwoven as to make a flat chain which is almost solid—that is, in which the interstices between the links are very small—and thus when these chains are secured as described, extending transversely of the tire with their edges in contact, an almost impenetrable armor is formed. The central portion of the chain, which extends across the face or tread of the tire, is formed straight or with parallel edges, so that as the tire is flattened by the weight at its point of contact with the ground the chains will lie closely in contact across that portion, and the end portions of each chain, which extend radially inward at each side of the tire, are tapered slightly to conform to radial lines drawn from the axis of the wheel, and thus lie in contact with each other at their edges throughout their lengths. The chains are formed very strong, and being securely attached they form a continuous shield inclosing the tire to effectually prevent its coming off, splitting, tearing, or exploding, and the armor being formed of entirely separate and independent chains does not hinder the tire from yielding freely and forms a roughened traction tread to prevent the wheel from slipping or skidding.

To prevent the chains from wearing the tire and also to insure the tire against becoming punctured by a spike or other sharp instrument which might be forced through or between the chains, a strip of leather 20 or other suitable material is laid on the tread of the tire, and to this strip are secured transverse flexible metal plates 21 upon its outer surface beneath the chains in any suitable manner, as by spurs 22, formed on the ends of the plates and pressed through and clenched down upon the strip.

In Figs. 4, 5, and 6 I have shown modified means for securing the armor-chains in place, in Fig. 4 the metal rim 23 being flanged at 24 or bent outward at one side of the tire and provided with a series of openings in which the ends of the chains are directly secured, their opposite ends being secured by adjusting-screws to a band 25, made of sheet metal in the form of a channel-bar, the heads of the screws lying within the channel, and to hold this band from slipping laterally from the tire said tire is formed with a slightly-upturned edge 26, engaging the outer edge of the band.

Fig. 5 shows a tire which is provided with laterally-extending flanges 27, by means of which it is secured to the rim, the armor-chains and said tire being secured to the rim by the detachable bands 28, which are formed of sheet metal folded to form channel-bands, each having a laterally-projecting flange 29 to extend inward over the flanges of the tire and engage the same, the ends of the chains being secured to the adjusting-screws, the heads of which lie in the channels of the bands. The metal rim is provided with upturned edges 26 to engage and prevent the bands from slipping from the rim.

In Fig. 6 is shown a construction in which the armor-chains are secured directly to the wheel-rim 30, (shown in plan view in Fig. 7,) which is provided near one edge with a series of holes 31 to receive the adjusting-screws for securing one end of the chains to the rim and at its opposite side is provided with a series of slots 32, extending inward from its edge, and a series of holes 33, one opposite the inner end of each slot, for the reception of adjusting-hooks 34, substituted for the screws, and adapted to be slipped into the slots and their upturned ends engaged with the holes 33. To prevent the hooks from becoming disengaged from their holes, a thin band 35 is secured to the outer surface of the rim adjacent to the hooks after they are in place, and this band is prevented from slipping laterally from the rim by providing the same with pins 36 to engage openings 37 in the rim.

It is proposed to clamp each of the different forms of securing-bands to the rim by providing each band with the link 12 and lever 10, (shown in Fig. 1;) but, if desired, these bands may be made in one piece instead of in segments, as shown in said figure.

Having thus fully described my invention, what I claim is—

1. The combination with a tire and a rim of greater width than that portion of the tire which engages said rim, of a securing-band engaging the outer surface of the rim at one side of the tire, means on the ends of said band for drawing said ends toward each other to clamp the band to the rim, a series of chains extending transversely across the tire and forming an armor therefor, and means for securing the ends of the chains to said band.

2. The combination of a tire having laterally-extending flanges, a wheel-rim, bands engaging the outer surface of the rim and each provided with a laterally-extending flange to engage the flanges on the tire and hold the same to the rim, means on the ends of the bands for drawing the ends toward each other to clamp the bands to the rim, a tire-armor, and means for securing the armor to the said bands.

3. The combination with a tire and a wheel-rim to which the tire is secured, of an armor for the tire consisting of a series of independent chains, a securing-band engaging the outer surface of the wheel-rim at one side of the tire, means on the ends of said band for drawing said ends toward each other to clamp the band about the rim, adjustable means for securing each of said chains to said band, and means for preventing the said band from slipping laterally from the rim.

4. The combination with a tire and a wheel-rim to which the tire is secured, of an armor for the tire, a securing-band to engage the outer surface of the rim adjacent to the tire and made in two or more parts, an arm formed on one end of one part of the band, a hook on the adjacent end of the other part to embrace said arm, a set-screw carried by the hook and engaging the arm to force the ends of the parts of the band toward each other to clamp the same to the rim, and means for securing the armor to the said band.

5. The combination with a tire and a wheel-rim to which the tire is adapted to be secured, of an armor for the tire, a securing-band to which the armor is attached adapted to engage the outer surface of the rim at one side of the tire, laterally-bent arms on the ends of said band, a lever pivotally attached to one of said arms and provided with a notch in one side at a distance from its pivot, and a loop pivotally attached to the arm on the adjacent end of the band and adapted to engage the notch in the lever when the same is passed through said loop.

6. The combination with a tire and a wheel-rim to which the tire is adapted to be secured, of an armor consisting of independent chains extending transversely of the tire with their edges in contact, securing-bands adapted to engage the outer surface of the rim at each side of the tire and each provided with a series of holes, means on said bands for drawing the ends of each toward each other to clamp the bands about the rim, adjusting-screws engaging the holes in the bands, stirrups attached to the ends of the chains, and nuts secured in said stirrups and engaging the screws.

7. The combination with a tire and a wheel-rim to which the tire is adapted to be secured, of a flexible strip on the tread of the tire, a series of independent flexible plates secured to said strip, a series of independent flat chains extending transversely of the tire in engagement with said plates, and means for adjustably and detachably securing the ends of the chains to the wheel-rim to form an armor for the tire and hold the strip with its plates in place.

8. The combination with a pneumatic tire, of a wheel-rim of greater width than the base of the tire which is adapted to be secured thereto and provided with longitudinal slots and notches in its edges, an armor consisting of independent chains formed of links woven flat and each having a central portion with parallel edges and tapering end portions, adjusting-screws secured to the ends of said chains, securing-bands engaging the outer surface of the rim at each side of the tire and each provided with a series of holes to receive the adjusting-screws, inwardly-extending arms on the ends of the bands extending through the notches in the rim, a lever pivoted to one of said arms on each band and provided with a notch in its side, a loop pivoted to the adjacent arm on each band to engage the notch in the lever, and pins on the bands to engage the slots in the rim.

In testimony whereof I affix my signature in presence of two witnesses.

ALANSON A. MOORE.

Witnesses:
OTTO F. BARTHEL,
THOS. S. LONGSTAFF.